(12) United States Patent
Zhu (10) Patent No.: US 11,787,440 B2
(45) Date of Patent: Oct. 17, 2023

(54) LANE BOUNDARY AND VEHICLE SPEED BASED NUDGE DECISION

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 18 days.

(21) Appl. No.: 16/984,889

(22) Filed: Aug. 4, 2020

(65) Prior Publication Data

US 2022/0041183 A1 Feb. 10, 2022

(51) Int. Cl.
*B60W 40/072* (2012.01)
*B60W 40/105* (2012.01)
*B60W 60/00* (2020.01)

(52) U.S. Cl.
CPC ...... *B60W 60/0015* (2020.02); *B60W 40/072* (2013.01); *B60W 40/105* (2013.01); *B60W 2520/10* (2013.01); *B60W 2552/30* (2020.02); *B60W 2554/404* (2020.02)

(58) Field of Classification Search
CPC ........... B60W 60/0015; B60W 40/072; B60W 40/105; B60W 2552/30; B60W 2554/404; B60W 2520/10
USPC .......................................................... 701/23
See application file for complete search history.

(56) References Cited

U.S. PATENT DOCUMENTS

| 11,192,558 | B2 * | 12/2021 | Thompson | G06V 20/56 |
| 2018/0105152 | A1 * | 4/2018 | Nagae | G08G 1/165 |
| 2018/0267548 | A1 * | 9/2018 | Sumioka | G05D 1/0214 |
| 2018/0370526 | A1 * | 12/2018 | Ohmura | G06V 20/584 |
| 2019/0186948 | A1 * | 6/2019 | Hayee | G01C 21/3697 |
| 2019/0276013 | A1 * | 9/2019 | Kim | G06V 20/588 |

FOREIGN PATENT DOCUMENTS

| CN | 106740835 | * | 5/2017 |
| JP | 2018089990 | * | 6/2018 |

OTHER PUBLICATIONS

Cottingham, Darren, How to Overtake Safely, Jun. 2, 2014, Driver Knowledge Test Resources (Year: 2014).*

* cited by examiner

*Primary Examiner* — Elaine Gort
*Assistant Examiner* — Matthias S Weisfeld
(74) *Attorney, Agent, or Firm* — WOMBLE BOND DICKINSON (US) LLP (57) ABSTRACT

Lane configuration of a lane on which an ADV is driving and a current speed of the ADV are determined. A nudge space is determined based on the lane configuration, the current speed, and a vehicle width of the ADV. Path planning is performed to generate a path to nudge an obstacle, in response to the determining that the nudge space is greater than a predetermined threshold nudge space. The ADV is controlled to drive autonomously according to the planned path to nudge the obstacle.

17 Claims, 9 Drawing Sheets

LANE BOUNDARY AND VEHICLE SPEED BASED NUDGE DECISION

TECHNICAL FIELD

Embodiments of the present disclosure relate generally to operating autonomous driving vehicles. More particularly, embodiments of the disclosure relate to motion planning of an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations mainly rely on reducing a speed of an ADV to avoid collisions with obstacles, without considering options of maneuvering around the obstacles. The conventional motion planning operations may not provide an optimal planned path for the ADV that is both efficient and safe.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a rule based method to decide whether to make a nudge action for an ADV is disclosed. The term "nudge" refers to maneuver around an obstacle/detected object to avoid the obstacle/detected object. The obstacle/detected object may include static and dynamic obstacle such as vehicles, motorcycles, bicycles, pedestrians, animals, buildings, etc. The term "to nudge an obstacle" means to maneuver around the obstacle to avoid the obstacle, including to move around the obstacle to avoid the obstacle laterally, in a direction perpendicular to a direction of a road on which the ADV is driving. In this method, whether to make a nudge path planning may be determined based on lane configuration of a lane on which the ADV is driving. A possible nudge space within the lane may be determined based on vehicle width parameter VW, current lane width parameter LW, or vehicle current speed S. The nudge space may be increased or reduced based on a boundary type of a boundary of the lane, or a maximum curvature of the lane. The nudge space may be reduced based on the vehicle current speed S. If the nudge space is larger than a predetermined threshold nudge space, path planning may be performed to search for a path with a nudge action.

According to some embodiments, lane configuration of a lane on which the ADV is driving and a current speed of the ADV are determined. A nudge space is determined based on the lane configuration, the current speed, and a vehicle width of the ADV. Path planning is performed to generate a path to nudge an obstacle, in response to the determining that the nudge space is greater than a predetermined threshold nudge space. The ADV is controlled to drive autonomously according to the planned path to nudge the obstacle.

Figure 1:
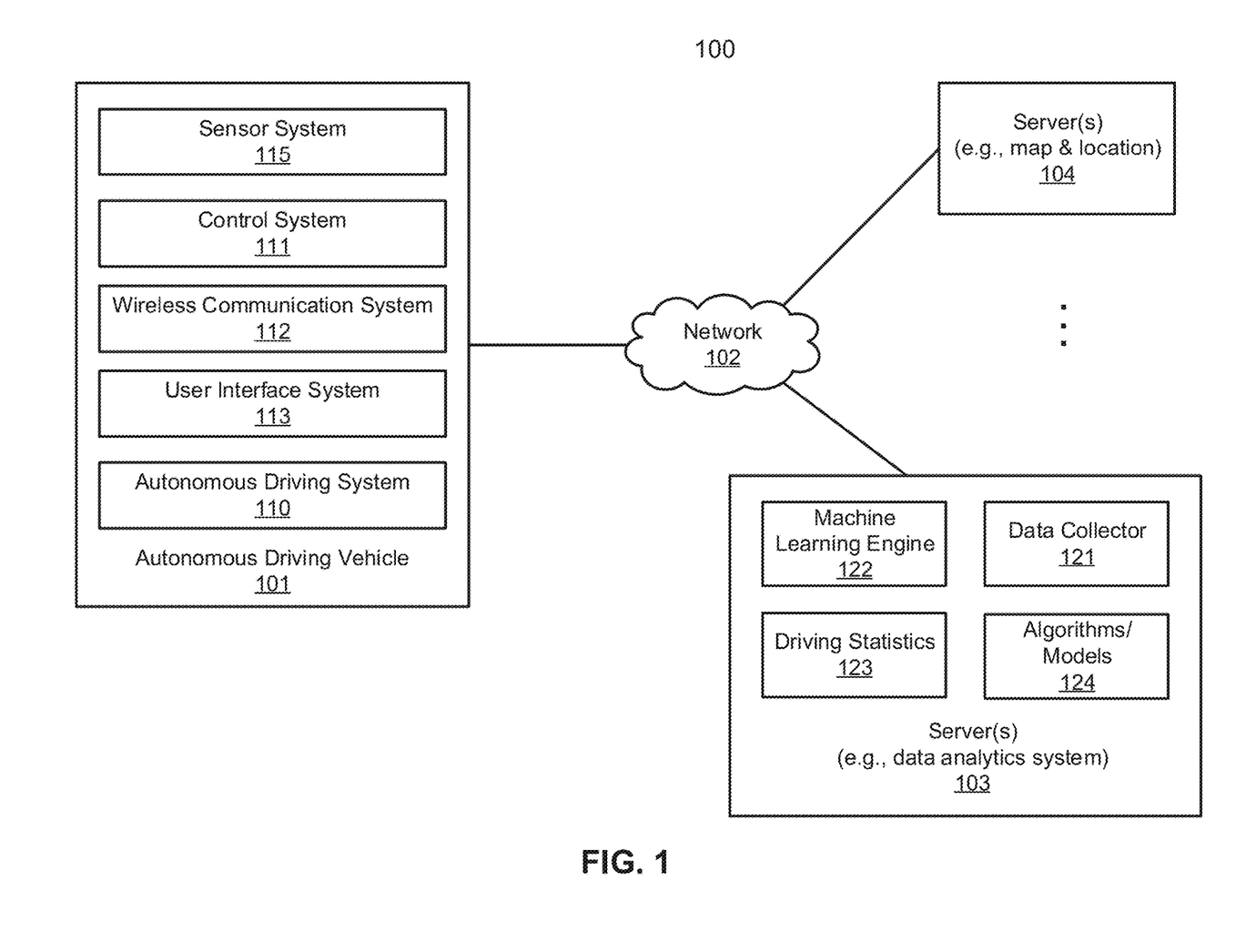
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
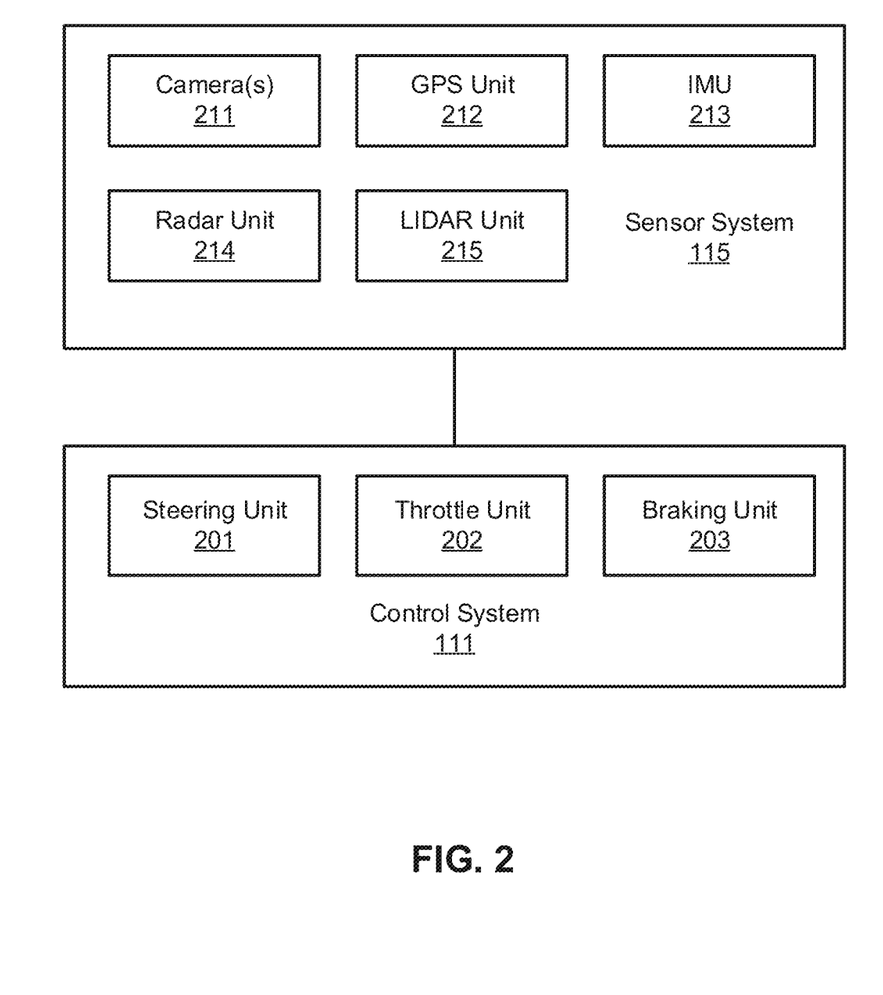
FIG. 2 is a block diagram illustrating an example of an autonomous driving vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to determine lane configuration of a lane on which the ADV is driving and a current speed of the ADV, an algorithm or model to determine a nudge space based on the lane configuration, the current speed, and a vehicle width of the ADV, an algorithm or model to perform path planning to generate a path to nudge an obstacle, in response to the determining that the nudge space is greater than a predetermined threshold nudge space, and/or an algorithm or model to control the ADV to drive autonomously according to the planned path to nudge the obstacle. Algorithms 124 can then be uploaded on ADVs to be utilized during autonomous driving in real-time.

Figure 3A:
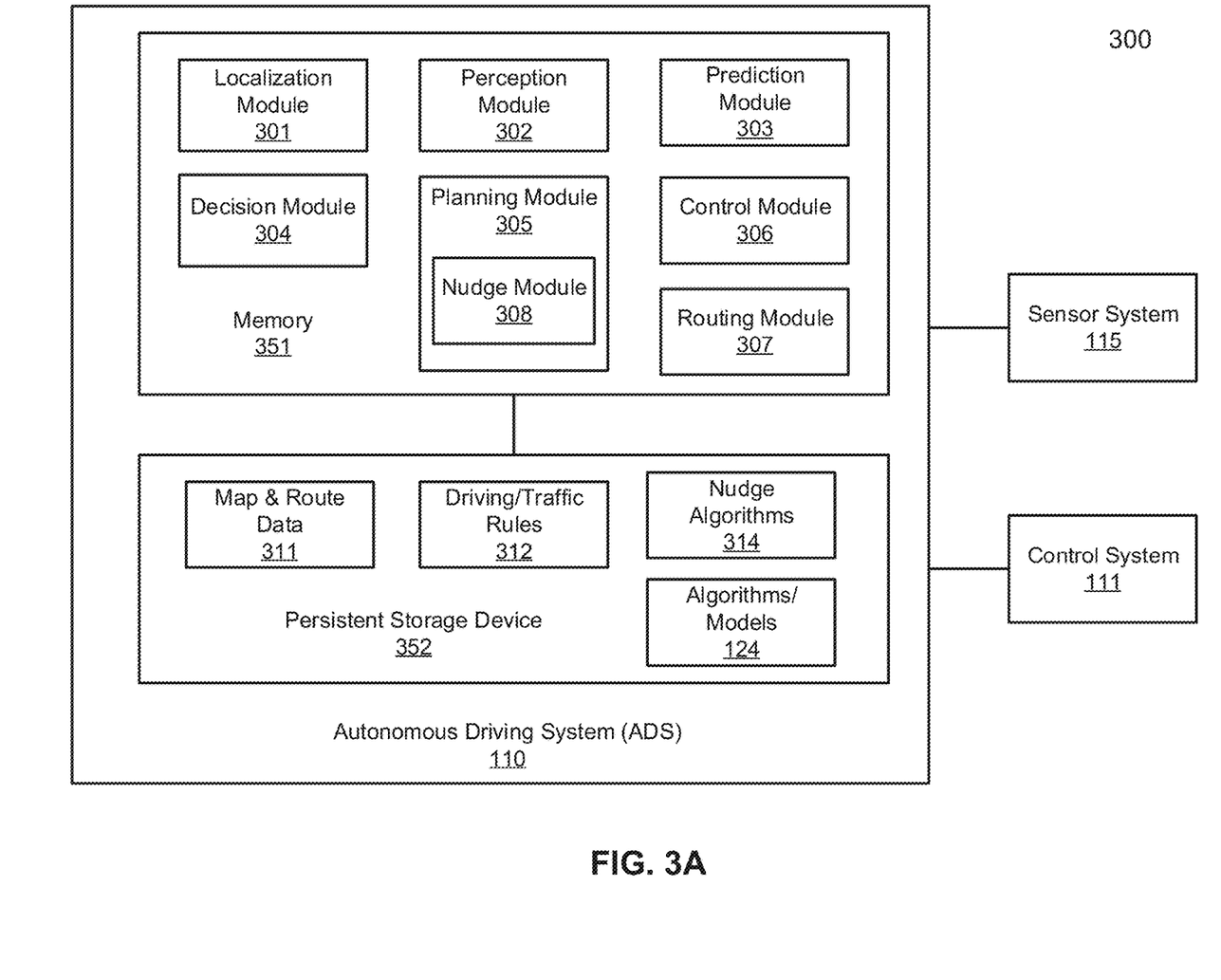
FIGS. 3A-3B are block diagrams illustrating an example of an autonomous driving system used with an autonomous driving vehicle according to one embodiment.
Figure 3B:
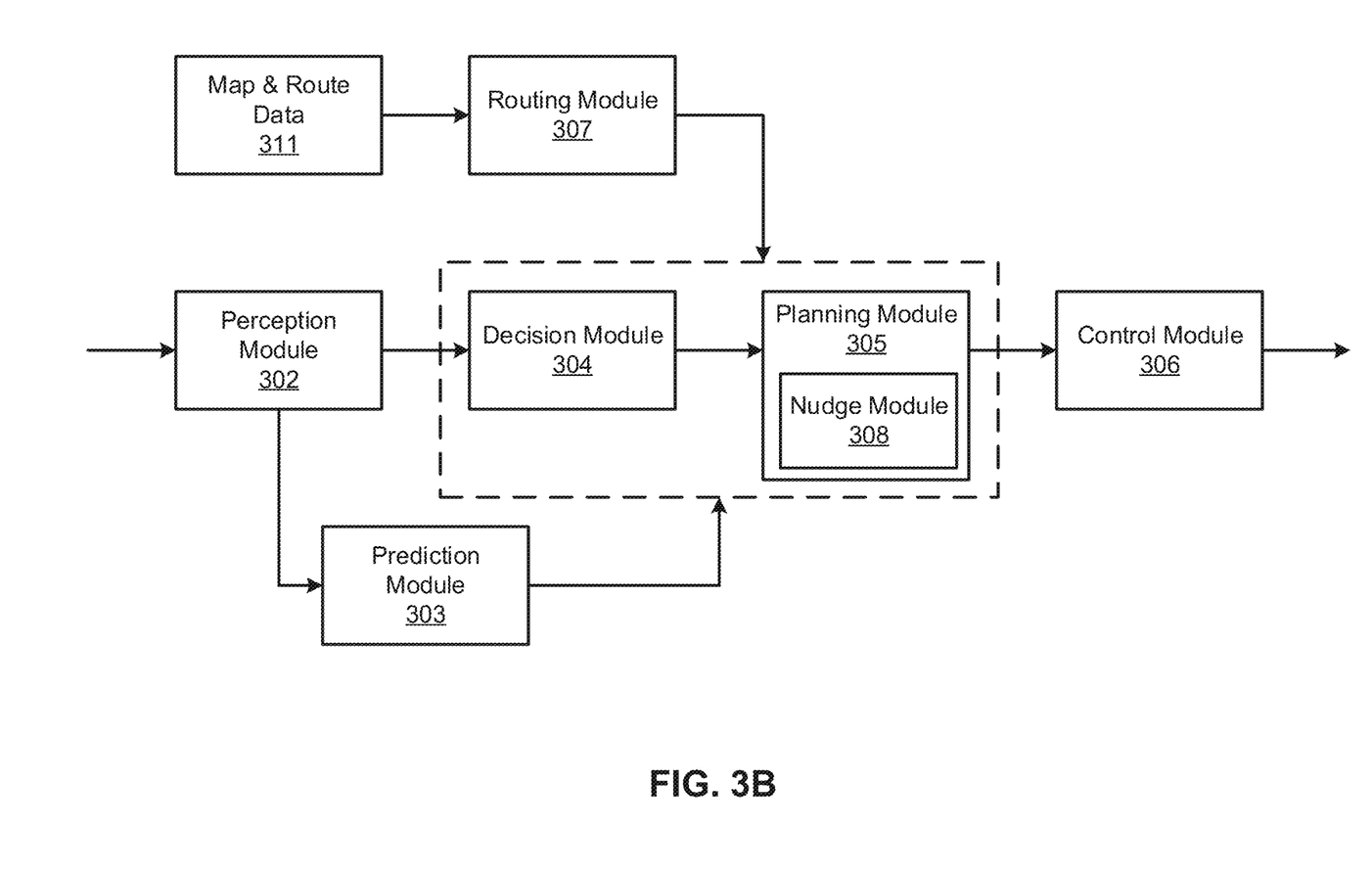

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305 including nudge module 308, control module 306, routing module 307.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

According to one embodiment, planning module 305 includes a nudge module 308. The nudge module 308 is configured to determine lane configuration of a lane on which the ADV is driving and a current speed of the ADV, to determine a nudge space based on lane configuration, the current speed, and a vehicle width of the ADV, and to determine that the nudge space is greater than a predetermined threshold nudge space. Planning module 305 is configured to generate a path to nudge an obstacle, in response to the determining that the nudge space is greater than a predetermined threshold nudge space.

Figure 4:
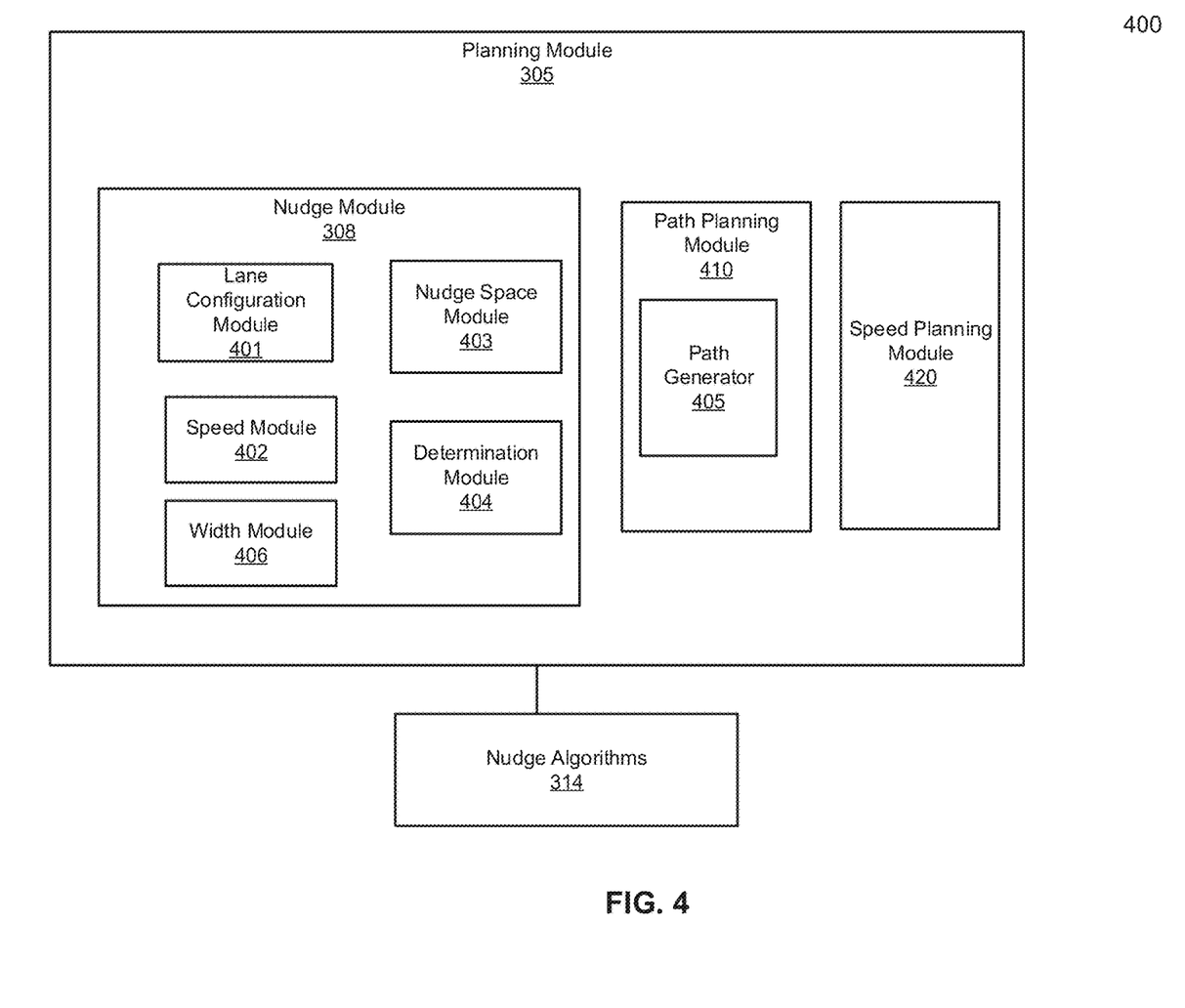
FIG. 4 is a block diagram illustrating an example of a nudge module of an autonomous driving system according to one embodiment.
Figure 5:
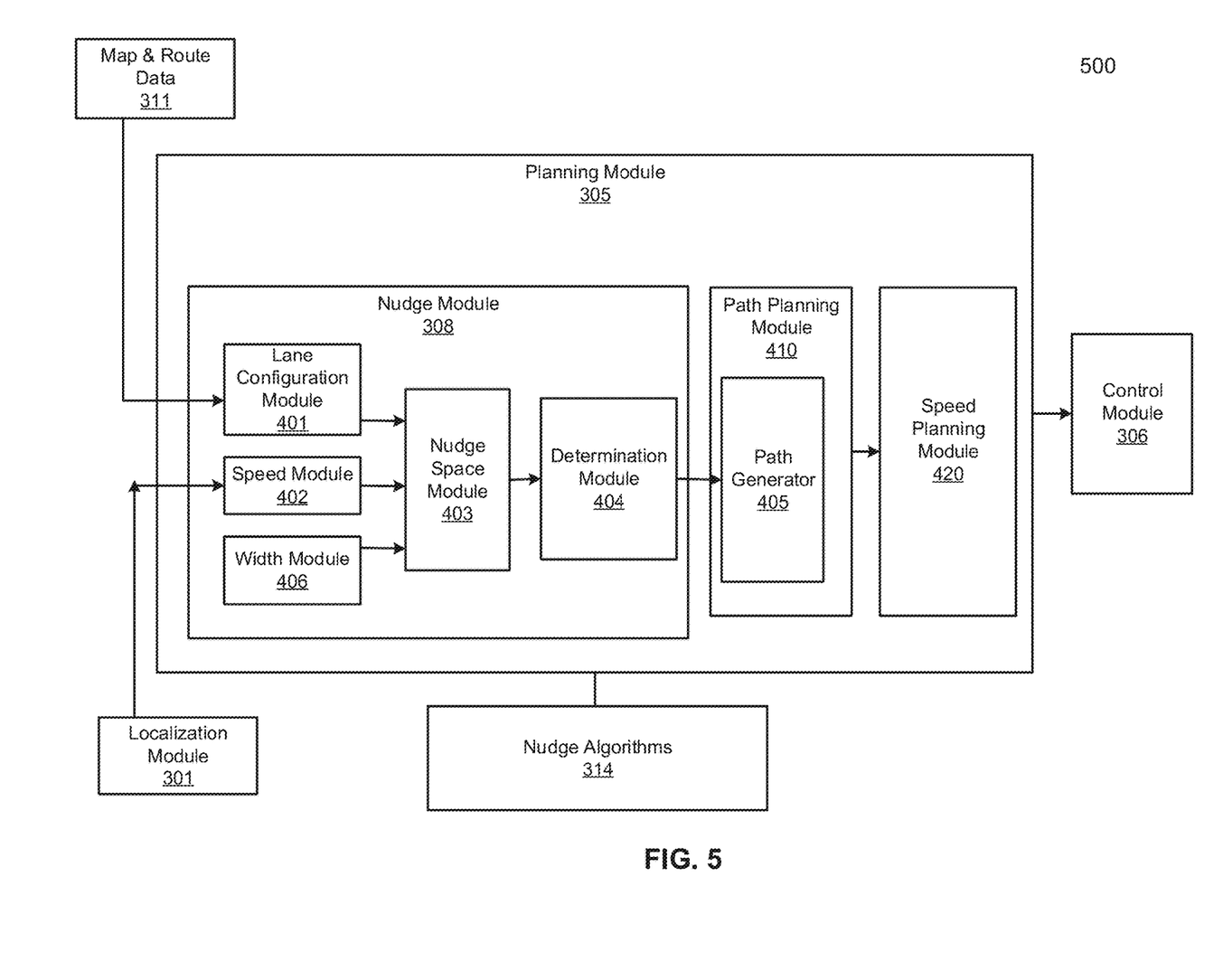
FIG. 5 is a processing flow diagram of a nudge module according to one embodiment.

FIG. 4 is a block diagram illustrating an example of a nudge module of an autonomous driving system according to one embodiment. FIG. 5 is a processing flow diagram of a nudge module according to one embodiment. Referring to FIG. 4 and FIG. 5, planning module 305 may include nudge module 308, path planning module 410 and speed planning module 420. In one embodiment, nudge module 308 may be a separate module than the path planning module 410. In another embodiment, nudge module 308 may be a sub-module included in path planning module 410. Nudge module 308 includes, but is not limited to, lane configuration module 401, speed module 402, nudge space module 403, and determination module 404, width module 406, which work together nudge algorithms or models 314 to determine to generate a path to nudge an obstacle. Note that modules 401-404 may be integrated into fewer number of modules or a single module.

According to one embodiment, lane configuration module 401 may be configured to determine lane configuration of a lane on which the ADV is driving, speed module 402 may be configured to determine a current speed of the ADV, and width module 406, may be configured to determine a vehicle width of the ADV. In one embodiment, a current lane width parameter LW may be determined by lane configuration module 401 from a HD Map in map and route data 311. In one embodiment, a vehicle current speed may be determined by speed module 402 from localization module 301. Nudge space module 403 may be configured to determine a nudge space based on the lane configuration, the current speed, and a vehicle width of the ADV. Determination module 404 may be configured to determine that the nudge space is greater than a predetermined threshold nudge space, and further configured to determine to generate a path to nudge an obstacle. Path planning module 410 includes path generator 405, which may be configured to generate the path to nudge an obstacle, in response to determining that the nudge space is greater than a predetermined threshold nudge space. Control module 306 may be configured to control the ADV to drive autonomously according to the generated path to nudge the obstacle.

Figure 6:
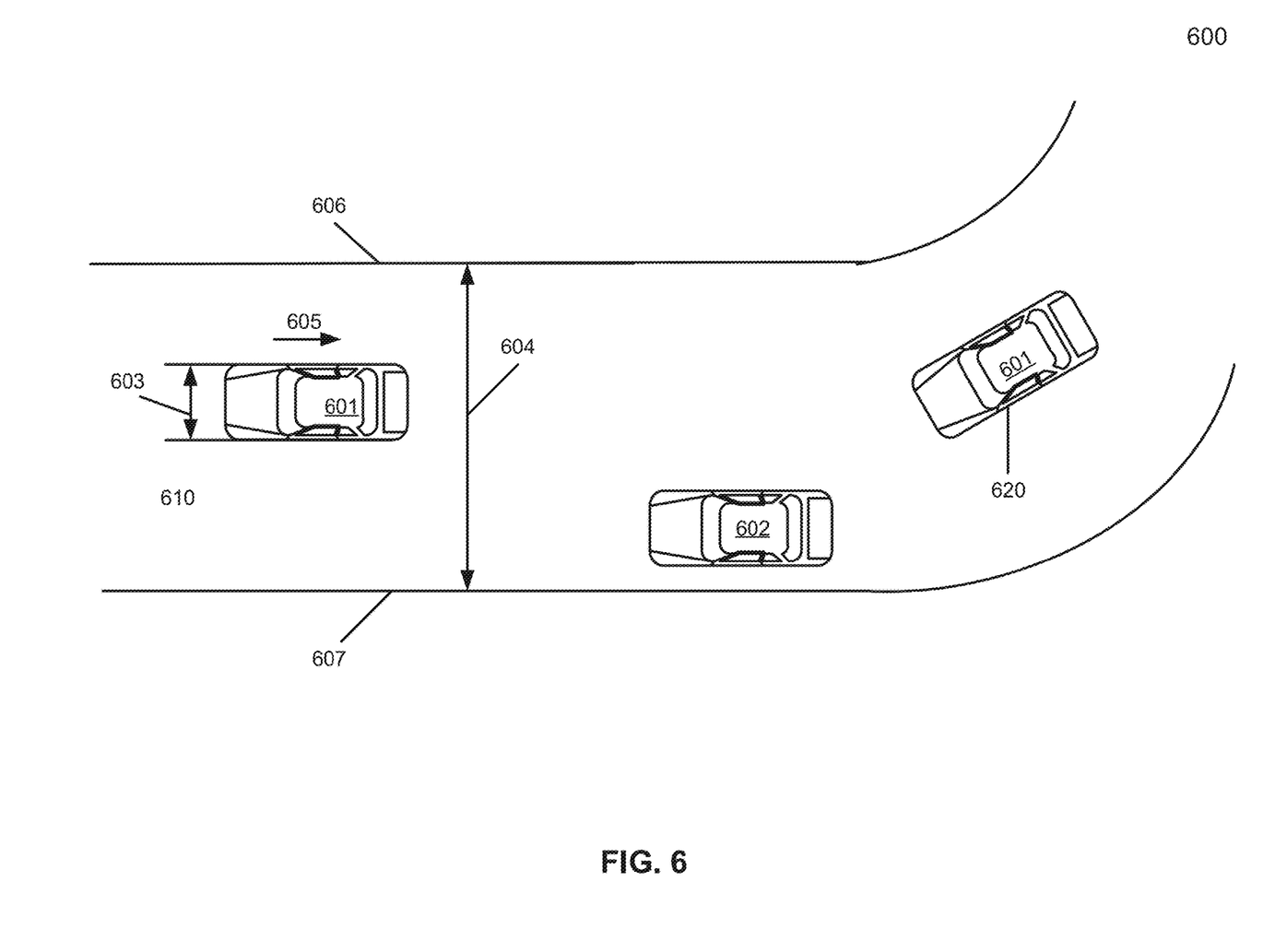
FIG. 6 shows an example of an ADV performing path planning to generate a path to nudge an obstacle.

FIG. 6 shows an example 600 of an ADV 601A performing path planning to generate a path to nudge an obstacle 602. Conventional motion planning operations mainly rely on reducing a speed of an ADV to avoid collision with an obstacle, without considering options of nudging the obstacle. However, in some situations, the obstacle may block a movement of the ADV for a long time, reducing speed may not be able to provide an efficient planning for the ADV. There may be a need to develop a nudge decision method to provide a planned path that is both efficient and safe.

Many elements may affect a decision about whether to nudge an obstacle for the ADV 601. A rule based method to decide whether to make a nudge path planning is disclosed herein. The method is based on lane configuration, a current speed of the vehicle, and/or a vehicle width of the ADV. By this method, a nudge action may be performed to search for a path to nudge the obstacle 602, thus providing the planned path that is both efficient and safe.

Referring to FIG. 6, a vehicle width parameter VW 603 may be determined from vehicle parameter configuration, e.g., by width module 406 (as illustrated in FIGS. 4 &5). A current lane width parameter LW 604 may be determined, for example, by lane configuration module 401, from a HD Map, e.g., in map and route data 311. A vehicle current speed S 605 of the ADV 601 may be determined, for example, by speed module 402, from localization module 301. A possible nudge space (initial nudge space) within the current lane may be determined by calculating (LW-VW):

Nudge Space$_{initial}$=LW-VW.

A boundary type of a lane boundary (e.g., 606, 607) of the lane may be determined by checking the HD map. If the lane boundary is not a physical barrier, the nudge space may be increased by adding a predetermined increment amount. In one embodiment, the predetermined increment amount may be 20 cm. The predetermined increment amount may have other values. If both left lane boundary 606 and right lane boundary 607 are not physical barriers, then the nudge space may be increased by doubling the predetermined increment amount, for example, by adding 40 cm. If one or two lane boundaries are not physical barriers, an adjusted nudge space may be determined by adding the predetermined increment amount or doubling the predetermined increment amount:

Nudge Space Addition$_{boundary\ type}$=20 or 40 cm.

A curvature of the current lane may be determined based on the lane configuration. The nudge space may be reduced based on the curvature of the lane. Curvature is the amount by which a curve deviates from being a straight line, or a surface deviates from being a plane. For curves, the canonical example is that of a circle, which has a curvature equal to the reciprocal of its radius. Smaller circles bend more sharply, and hence have higher curvature. The curvature at a point of a differentiable curve is the curvature of its osculating circle, that is the circle that best approximates the curve near this point.

In one embodiment, a maximum curvature of the current lane, from a current position 610 of the ADV 601 to a predicted position 620 where the ADV would be in 4 seconds according to the current speed, may be determined. If the maximum curvature is X and X>0.05, then the nudge space may be reduced by: (X−0.05)×10 cm. If the maximum curvature is less or equal to 0.05, the nudge space may not be reduced. If the maximum curvature of the current lane, from the current position 610 of the ADV 601 to the predicted position 620 where the ADV would be in 4 seconds according to the current speed, is X and X>0.05, the nudge space may be reduced by:

Nudge Space Deduction$_{Curvature}$=(X−0.05)×10 cm.

The nudge space may be reduced based on the vehicle current speed S 605 of the ADV 601. In one embodiment, the nudge space may be reduced by a predetermined decrement amount, if the current speed 605 of the ADV 601 is greater than or equal to a first predetermined speed threshold. In one embodiment, the nudge space may be reduced by a predetermined decrement amount, when the current speed of the ADV 601 is greater than or equal to the first predetermined speed threshold. A nudge possibility within the lane may be reduced if the current speed 605 of the ADV 601 is greater than or equal to the first predetermined speed threshold. For example, the first predetermined speed threshold may be 20 m/s or 72 km/h. The first predetermined speed threshold may have other values. For example, the predetermined decrement amount may be 100 cm. If the current speed S 605 of the ADV 601 is 20 m/s or 72 km/h or higher, the nudge space may be reduced by 100 cm.

Nudge Space Reduction$_{speed\ fixed}$=100 cm.

In one embodiment, the nudge space may be reduced linearly when the current speed is within a predetermined range. In one embodiment, the nudge space may be reduced linearly if the current speed is within the predetermined range. The predetermined range may be from the first predetermined speed threshold to a second predetermined speed threshold. For example, the predetermined range may be between 20 m/s and 5 m/s. The predetermined range may have other values. For example, if the current speed S 605 of the ADV 601 is between 20 m/s and 5 m/s, the nudge space may be reduced linearly:

Nudge Space Reduction$_{speed\ linear}$=100×(Speed−5)/(20−5) cm.

In one embodiment, the nudge space may not be reduced, if the current speed 605 of the ADV 601 is less than or equal to the second predetermined speed threshold. For example, the second predetermined speed threshold may be 5 m/s or 18 km/h. The second predetermined speed threshold may have other values. If the current speed S 605 of the ADV is 5 m/s or 18 km/h or lower, the nudge space may not be reduced:

Nudge Space Reduction$_{speed}$=Nudge Space Reduction$_{speed\ linear}$ or Nudge Space Reduction$_{fixed}$.

The final nudge space may be determined by the above operations:

Nudge Space$_{final}$=Nudge Space$_{initial}$±Nudge Space Addition$_{boundary\ type}$−Nudge Space Deduction$_{Curvature}$−Nudge Space Reduction$_{speed}$ If the final nudge space is larger or equal to a predetermined threshold nudge space, a decision is made to generate a path to nudge an obstacle 602. For example, the predetermined threshold nudge space may be 60 cm, which may the typical buffer space. The predetermined threshold nudge space may have other values. Path planning module 410 (as illustrated in FIG. 4) may be notified that it is OK to nudge. Path planning module 410 may perform a nudge action. A path with the nudge action to the obstacle may be searched. The path with the nudge action may maneuver around the obstacle to avoid the obstacle. The path with the nudge action may move around the obstacle to avoid the obstacle laterally, in a direction perpendicular to a direction of the lane. Path generator 405 (as illustrated in FIG. 4) may generate the path to nudge the obstacle 602.

If the final nudge space is less than the predetermined threshold nudge space, the nudge action may not be performed. Path planning module 410 will not perform the nudge action. Path planning module 410 will not generate a path to avoid the obstacle laterally. Without the nudge action, speed planning module 420 (as illustrated in FIG. 4) may reduce the current speed of the ADV 601 to avoid a collision with the obstacle longitudinally, in a direction parallel to the direction of the lane.

Figure 7:
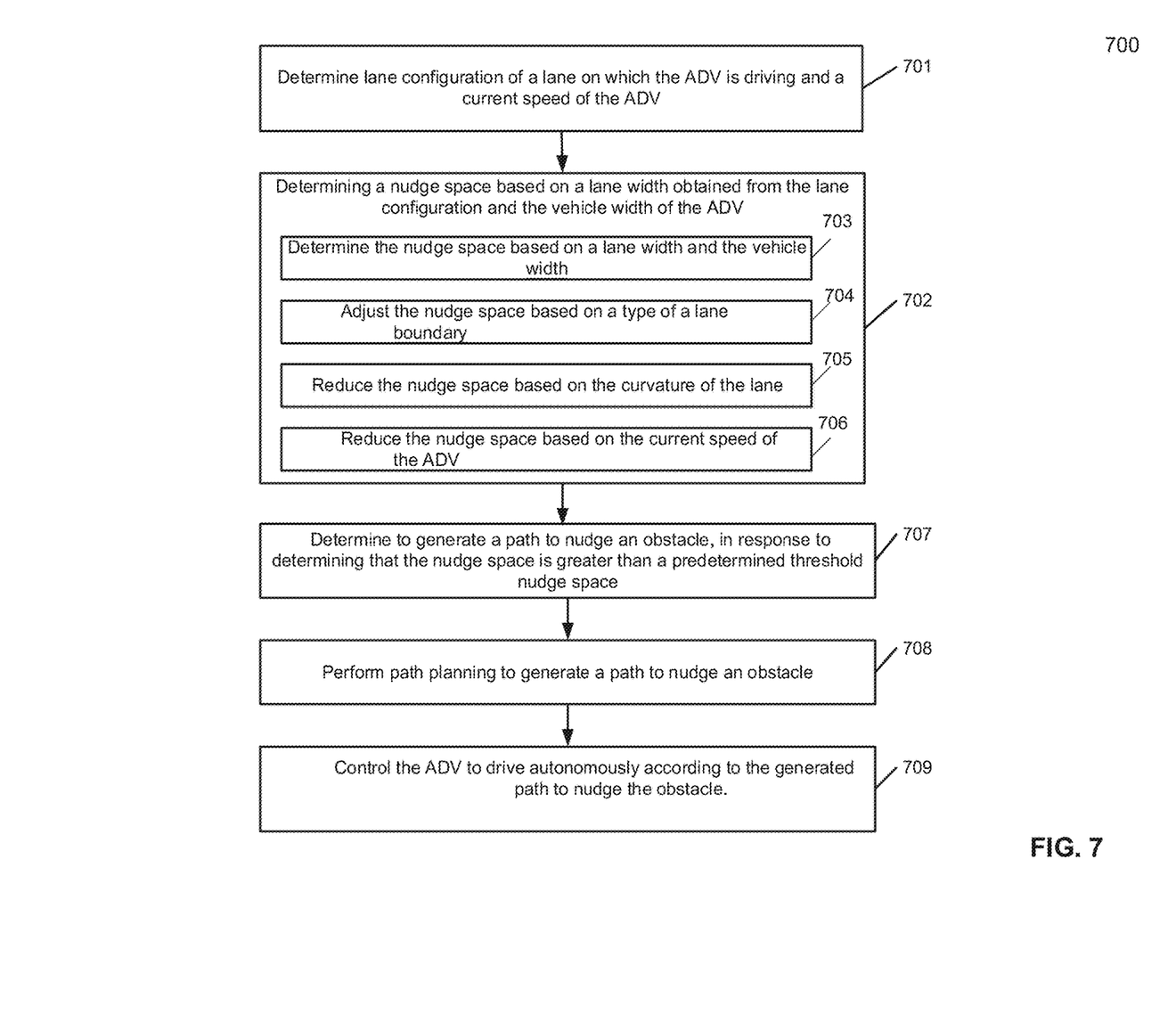
FIG. 7 is a flow diagram illustrating an example of a process for generating a path to nudge an obstacle according to one embodiment.

FIG. 7 is a flow diagram illustrating an example of a process 700 for generating a path to nudge an obstacle according to one embodiment. Process 700 may be performed by processing logic which may include software, hardware, or a combination thereof. For example, process 700 may be performed by planning module 305 including nudging module 308 and planning module 410.

Referring to FIG. 7, in operation 701, processing logic determines lane configuration of a lane on which the ADV is driving and a current speed of the ADV. In one embodiment, the lane configuration includes at least one of a width of the lane, a type of a boundary of the lane, or a curvature of the lane.

In operation 702, processing logic determines a nudge space based on the lane configuration, the current speed, and a vehicle width of the ADV. In one embodiment, processing logic determines the nudge space based on a lane width obtained from the lane configuration and the vehicle width of the ADV, at 703.

In one embodiment, processing logic adjusts the nudge space based on a type of a lane boundary of the lane, at 704. In one embodiment, processing logic adjusts the nudge comprises increasing the nudge space in response to determining that the lane boundary of the lane is not a physical barrier.

In one embodiment, processing logic determines a curvature of the lane based on the lane configuration. In one embodiment, processing logic reduces the nudge space based on the curvature of the lane, at 705.

In one embodiment, processing logic reduces the nudge space based on the current speed of the ADV, at 706. In one embodiment, the nudge space is reduced linearly when the current speed is within a predetermined range. In one embodiment, the nudge space is reduced by a predetermined decrement amount if the current speed of the ADV is greater than a first predetermined speed threshold.

In operation 707, processing logic determines to generate a path to nudge an obstacle, in response to the determining that the nudge space is greater than a predetermined threshold nudge space.

In operation 708, processing logic performs path planning to generate a path to nudge an obstacle, in response to determining that the nudge space is greater than a predetermined threshold nudge space In operation 709, processing logic controls the ADV to drive autonomously according to the generated path to nudge the obstacle.

Figure 8:
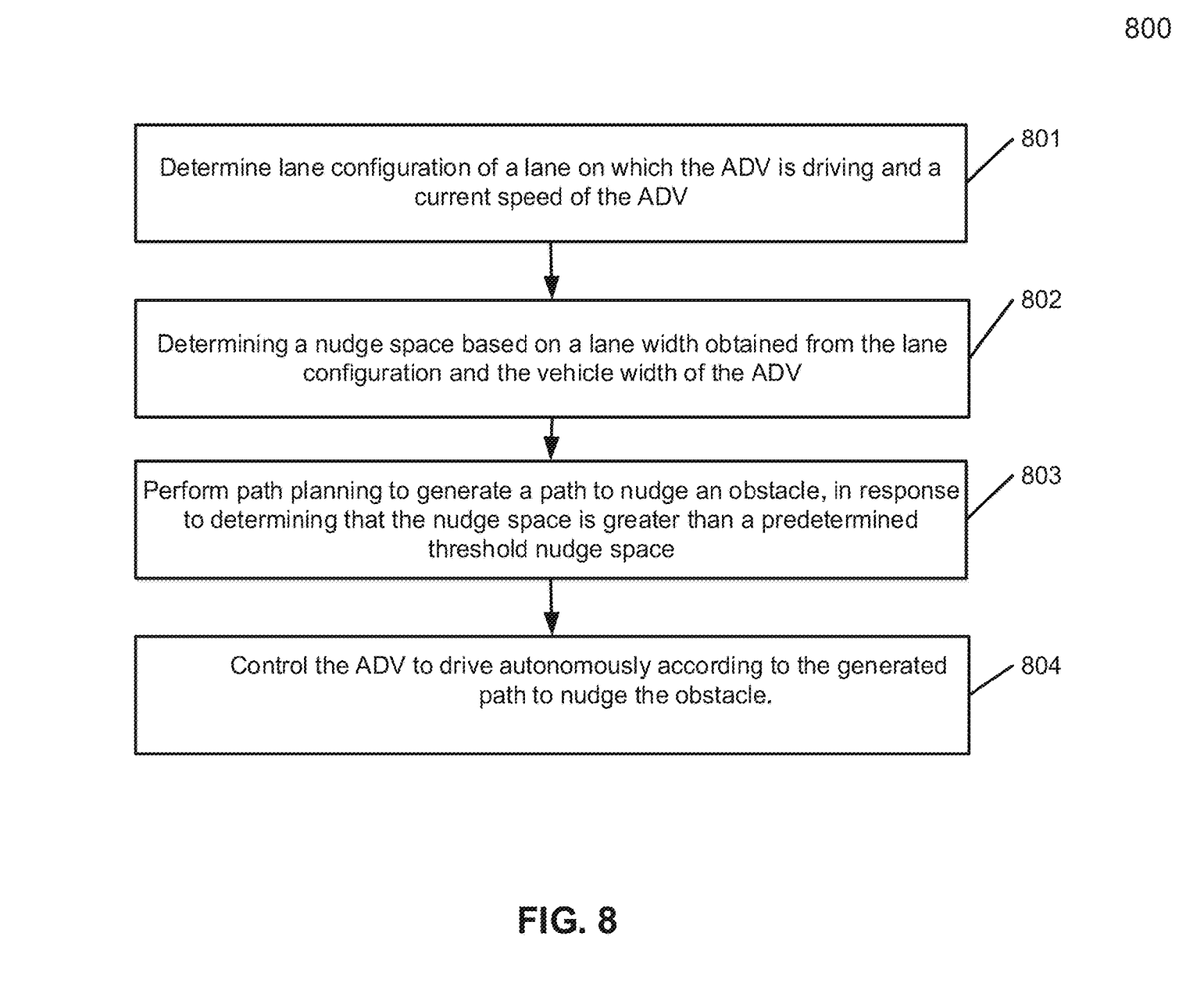
FIG. 8 is a flow diagram illustrating an example of a process for generating a path to nudge an obstacle according to one embodiment.

FIG. 8 is a flow diagram illustrating an example of a process 800 for generating a path to nudge an obstacle according to one embodiment. Process 800 may be performed by processing logic which may include software, hardware, or a combination thereof. For example, process 800 may be performed by planning module 305 including nudging module 308 and planning module 410. Referring to FIG. 8, in operation 801, processing logic determines lane configuration of a lane on which the ADV is driving and a current speed of the ADV. In operation 802, processing logic determines a nudge space based on the lane configuration, the current speed, and a vehicle width of the ADV. In operation 803, processing logic performs path planning to generate a path to nudge an obstacle, in response to determining that the nudge space is greater than a predetermined threshold nudge space In operation 804, processing logic controls the ADV to drive autonomously according to the generated path to nudge the obstacle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:

determining a lane configuration of a lane on which the ADV is driving and a current speed of the ADV;
determining a nudge space to maneuver around an obstacle to avoid the obstacle based on the lane configuration, the current speed, and a vehicle width of the ADV, comprising
  determining an initial nudge space based on a lane width obtained from the lane configuration and the vehicle width of the ADV, comprising determining the initial nudge space by calculating a difference of the lane width and the vehicle width of the ADV; and
  determining the nudge space by increasing or decreasing the initial nudge space based on a type of a lane boundary of the lane, a curvature of the lane, and the current speed of the ADV, including
    in response to determining that one or both lane boundaries are not physical barriers, determining a first nudge space by adding a predetermined increment amount or adding double the predetermined increment amount to the initial nudge space;
    determining a maximum curvature of the lane from a current position of the ADV to a predicted position at a predetermined future time according to the current speed; and
    in response to determining that the maximum curvature is greater than a predetermined threshold value, determining the nudge space by decreasing the first nudge space to generate a second nudge space based on a difference between the maximum curvature and the predetermined threshold value, wherein the second nudge space is the first nudge space minus a nudge space deduction, and wherein the nudge space deduction is a predetermined value multiplied by the difference between the maximum curvature and the predetermined threshold value;
    in response to determining that the current speed of the ADV is greater than or equal to a first predetermined speed threshold, determining the nudge space by reducing the second nudge space by a predetermined decrement amount;
    in response to determining that the current speed of the ADV is less than the first predetermined speed threshold and above a second predetermined speed threshold, determining the nudge space by reducing the second nudge space linearly; and
    in response to determining that the current speed of the ADV is less than the second predetermined speed threshold, determining the nudge space to be the second nudge space;
  performing path planning to generate a path to nudge the obstacle, based on the first nudge space or the second nudge space, in response to determining that the nudge space is greater than a predetermined threshold nudge space; and
  controlling the ADV to drive autonomously according to the generated path to nudge the obstacle.

2. The method of claim 1, wherein the lane configuration includes at least one of a width of the lane, a type of a boundary of the lane, or a curvature of the lane.

3. The method of claim 1, further comprising determining to generate a path to nudge the obstacle, in response to the determining that the nudge space is greater than a predetermined threshold nudge space.

4. The method of claim 1, wherein the determining the nudge space by increasing or decreasing the initial nudge space based on the type of the lane boundary of the lane, the curvature of the lane, and the current speed of the ADV comprises determining the nudge space by increasing the initial nudge space in response to determining that the lane boundary of the lane is not a physical barrier.

5. The method of claim 1, wherein the determining the nudge space by increasing or decreasing the initial nudge space based on the type of the lane boundary of the lane, the curvature of the lane, and the current speed of the ADV comprises:
  determining the curvature of the lane based on the lane configuration; and
  determining the nudge space by decreasing the initial nudge space based on the curvature of the lane.

6. The method of claim 1, wherein the determining the nudge space by increasing or decreasing the initial nudge space based on the type of the lane boundary of the lane, the curvature of the lane, and the current speed of the ADV comprises determining the nudge space by decreasing the initial nudge space based on the current speed of the ADV.

7. The method of claim 6, wherein the initial nudge space is reduced linearly when the current speed is within a predetermined range.

8. The method of claim 6, wherein the initial nudge space is reduced by a predetermined decrement amount if the current speed of the ADV is greater than a first predetermined speed threshold.

9. A non-transitory machine-readable medium having instructions stored therein, which when executed by a processor, cause the processor to perform operations, the operations comprising:
  determining a lane configuration of a lane on which an autonomous driving vehicle (ADV) is driving and a current speed of the ADV;
  determining a nudge space to maneuver around an obstacle to avoid the obstacle based on the lane configuration, the current speed, and a vehicle width of the ADV, comprising
    determining an initial nudge space based on a lane width obtained from the lane configuration and the vehicle width of the ADV, comprising determining the initial nudge space by calculating a difference of the lane width and the vehicle width of the ADV; and
    determining the nudge space by increasing or decreasing the initial nudge space based on a type of a lane boundary of the lane, a curvature of the lane, and the current speed of the ADV, including
      in response to determining that one or both lane boundaries are not physical barriers, determining a first nudge space by adding a predetermined increment amount or adding double the predetermined increment amount to the initial nudge space;
      determining a maximum curvature of the lane from a current position of the ADV to a predicted position at a predetermined future time according to the current speed; and
      in response to determining that the maximum curvature is greater than a predetermined threshold value, determining the nudge space by decreasing the first nudge space to generate a second nudge space based on a difference between the maximum curvature and the predetermined threshold value, wherein the second nudge space is the first nudge space minus a nudge space deduction, and wherein the nudge space deduction is a predetermined value multiplied by the difference between the maximum curvature and the predetermined threshold value;
in response to determining that the current speed of the ADV is greater than or equal to a first predetermined speed threshold, determining the nudge space by reducing the second nudge space by a predetermined decrement amount;
in response to determining that the current speed of the ADV is less than the first predetermined speed threshold and above a second predetermined speed threshold, determining the nudge space by reducing the second nudge space linearly; and
in response to determining that the current speed of the ADV is less than the second predetermined speed threshold, determining the nudge space to be the second nudge space;
performing path planning to generate a path to nudge an obstacle, based on the first nudge space or the second nudge space, in response to determining that the nudge space is greater than a predetermined threshold nudge space; and
controlling the ADV to drive autonomously according to the generated path to nudge the obstacle.

10. The operation of claim 9, wherein the determining the nudge space by increasing or decreasing the initial nudge space based on the type of the lane boundary of the lane, the curvature of the lane, and the current speed of the ADV comprises determining the nudge space by decreasing the initial nudge space based on the current speed of the ADV.

11. The operation of claim 10, wherein the initial nudge space is reduced linearly when the current speed is within a predetermined range.

12. The system of claim 11, wherein the determining the nudge space by increasing or decreasing the initial nudge space based on the type of the lane boundary of the lane, the curvature of the lane, and the current speed of the ADV comprises determining the nudge space by increasing the initial nudge space in response to determining that the lane boundary of the lane is not a physical barrier.

13. The operation of claim 9, wherein the determining the nudge space by increasing or decreasing the initial nudge space based on the type of the lane boundary of the lane, the curvature of the lane, and the current speed of the ADV comprises determining the nudge space by increasing the initial nudge space in response to determining that the lane boundary of the lane is not a physical barrier.

14. The operation of claim 9, wherein the determining the nudge space by increasing or decreasing the initial nudge space based on the type of the lane boundary of the lane, the curvature of the lane, and the current speed of the ADV comprises:
determining the curvature of the lane based on the lane configuration; and
determining the nudge space by decreasing the initial nudge space based on the curvature of the lane.

15. The operation of claim 9, wherein the lane configuration includes at least one of a width of the lane, a type of a boundary of the lane, or a curvature of the lane.

16. A data processing system, comprising:
a processor; and
a memory coupled to the processor to store instructions, which when executed by the processor, cause the processor to perform operations, the operations including determining a lane configuration of a lane on which an autonomous driving vehicle (ADV) is driving and a current speed of the ADV;
determining a nudge space to maneuver around an obstacle to avoid the obstacle based on the lane configuration, the current speed, and a vehicle width of the ADV, comprising
determining an initial nudge space based on a lane width obtained from the lane configuration and the vehicle width of the ADV, comprising determining the initial nudge space by calculating a difference of the lane width and the vehicle width of the ADV; and
determining the nudge space by increasing or decreasing the initial nudge space based on a type of a lane boundary of the lane, a curvature of the lane, and the current speed of the ADV, including
in response to determining that one or both lane boundaries are not physical barriers, determining a first nudge space by adding a predetermined increment amount or adding double the predetermined increment amount to the initial nudge space;
determining a maximum curvature of the lane from a current position of the ADV to a predicted position at a predetermined future time according to the current speed; and
in response to determining that the maximum curvature is greater than a predetermined threshold value, determining the nudge space by decreasing the first nudge space to generate a second nudge space based on a difference between the maximum curvature and the predetermined threshold value, wherein the second nudge space is the first nudge space minus a nudge space deduction, and wherein the nudge space deduction is a predetermined value multiplied by the difference between the maximum curvature and the predetermined threshold value;
in response to determining that the current speed of the ADV is greater than or equal to a first predetermined speed threshold, determining the nudge space by reducing the second nudge space by a predetermined decrement amount;
in response to determining that the current speed of the ADV is less than the first predetermined speed threshold and above a second predetermined speed threshold, determining the nudge space by reducing the second nudge space linearly; and
in response to determining that the current speed of the ADV is less than the second predetermined speed threshold, determining the nudge space to be the second nudge space;
performing path planning to generate a path to nudge an obstacle, based on the first nudge space or the second nudge space, in response to determining that the nudge space is greater than a predetermined threshold nudge space; and
controlling the ADV to drive autonomously according to the generated path to nudge the obstacle.

17. The system of claim 16, wherein the lane configuration includes at least one of a width of the lane, a type of a boundary of the lane, or a curvature of the lane.

* * * * *